Apr. 17, 1923.
A. S. BRANDOCK
1,452,235
WEDGLESS DRIVING BOX
Filed April 30, 1921
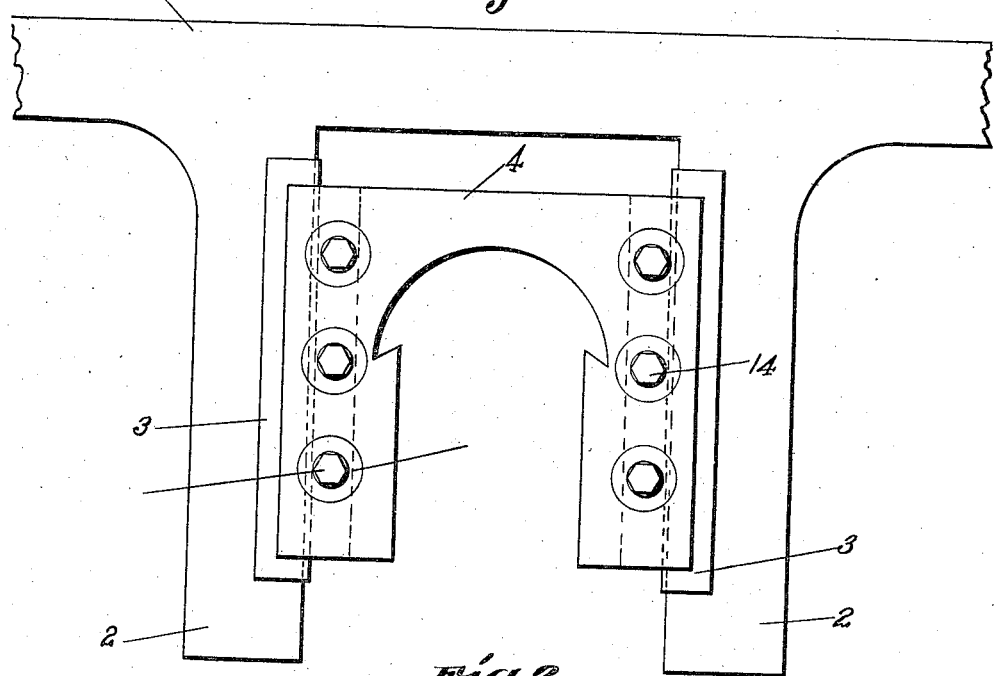
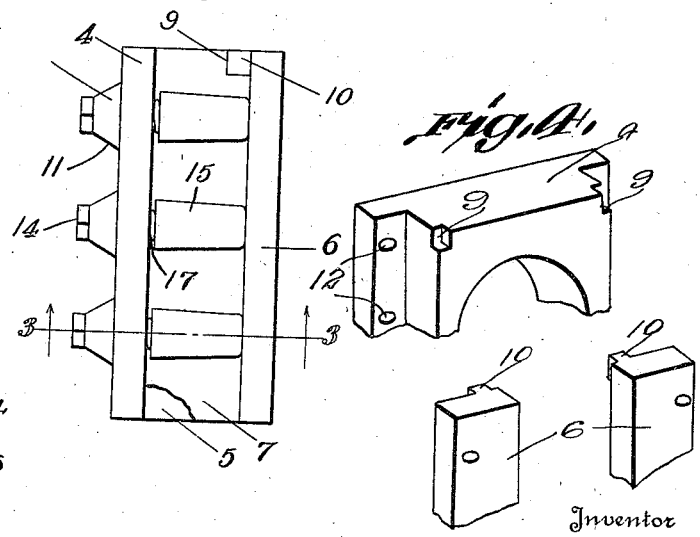
Inventor
A. S. Brandock.
By C. A. Snow & Co.
Attorneys Patented Apr. 17, 1923.

1,452,235

UNITED STATES PATENT OFFICE.

ANDREW S. BRANDOCK, OF PUEBLO, COLORADO.

WEDGELESS DRIVING BOX.

Application filed April 30, 1921. Serial No. 465,685.

*To all whom it may concern:*

Be it known that I, ANDREW S. BRANDOCK, a citizen of the United States, residing at Pueblo, in the county of Pueblo and State of Colorado, have invented a new and useful Wedgeless Driving Box, of which the following is a specification.

The device forming the subject matter of this application is a driving box, and the invention aims to provide novel means whereby relative movement between the driving box and the frame of a locomotive engine may be taken up automatically, without resorting to wedges.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a portion of a locomotive frame, whereunto the device forming the subject matter of this application has been applied; Figure 2 is a side elevation of the box; and Figure 3 is a section on the line 3—3 of Figure 2. Figure 4 is a composite perspective view showing parts of the device in spaced relation to each other, portions being broken away.

The numeral 1 marks a portion of the frame of a locomotive, the same embodying arms 2. U-shaped wear plates 3 are secured on the arms 2 and, preferably are hardened.

The driving box includes a front member 4 having rearwardly extended flanges 5 against which back members 6 abut. The parts 4 and 6 define grooves 8 whereby the bearing box is mounted on the wear plates 3 of the arms 2. The outer surfaces of the flanges 5 carry hardened wear plates 7. In their rear edges, the flanges 5 are supplied with notches 9 receiving lugs 10 on the back members 6. The front member 4 may be supplied, if desired, with forwardly extended bosses 11. Openings 12 extend through the bosses 11 and through the front member 4.

The members 4 and 6 are held together by securing elements 14, passing through the openings 12, the securing elements being, if desired, in the form of bolts, having their rear ends threaded into the back members 6, the heads of the securing elements bearing on the bosses 11. On the securing elements 14 frusto-conical or tapered rollers 15 are journaled, the rollers being located in the grooves 8 and are designed to take the place of wedges, the frame of the locomotive and the driving box to be tapered to conform to the tapered rollers. Sleeves 16 may surround the securing elements 14, within the openings 12. Compression springs 17 surround the sleeves 16 and are located in the openings 12. The inner ends of the springs abut against the wider ends of the rollers 15, the outer ends of the springs abutting against the heads or nuts on the securing elements 14. The rollers 15 bear against the wear plates 7 on the box, and against the wear plates 3 on the frame 1.

In practical operation, the springs 17 advance the frusto-conical rollers 15 which serve, automatically to take up wear. Should the springs 17 happen to rotate, the sleeves 16 prevent the springs from being worn by contact with the outer portions of the securing elements 14. The sleeves 16, especially, however, serve to retain the springs 17 against lateral flexing.

It is obvious that, as hereinbefore pointed out, the frusto-conical rollers 15 will be advanced by the springs 17 and, in this way, wear will be taken up automatically.

I claim:—

1. In a device of the class described, a driving box; frusto-conical rollers; means for mounting the rollers on the box for rotation and for endwise movement; and spring means for advancing the rollers.

2. In a device of the class described, a driving box comprising a front member and a back member defining a groove; a frusto-conical roller located in the groove; a securing element connecting said members and extended across the groove, the roller being journaled on the securing element; and spring means for advancing the roller.

3. In a device of the class described, a driving box embodying front and rear members; a securing element connecting said members; a frusto-conical roller journaled on the securing element; and a spring housed in one of said members and co-operating with the roller to advance the roller.

In testimony that I claim the foregoing as my own, I have hereto affixed my signature in the presence of two witnesses.

ANDREW S. BRANDOCK.

Witnesses:
C. H. CAMBRON,
W. D. KORN.